(12) United States Patent
Kauffman et al.

(10) Patent No.: US 7,262,413 B2
(45) Date of Patent: Aug. 28, 2007

(54) PHOTOCONDUCTIVE BOLOMETER INFRARED DETECTOR

(76) Inventors: Christopher L. Kauffman, 90 North La., Lake Zurich, IL (US) 60047; Sung-Shik Yoo, 1501 Churchill Dr. #102, Palatine, IL (US) 60074; Timothy R. Beystrum, 2504 E. Indigo Brush Rd., Phoenix, AZ (US) 85048

(*) Notice: Subject to any disclaimer, the term of this patent is extended or adjusted under 35 U.S.C. 154(b) by 139 days.

(21) Appl. No.: 11/079,592

(22) Filed: Mar. 14, 2005

(65) Prior Publication Data

US 2006/0202120 A1   Sep. 14, 2006

(51) Int. Cl.
   *G01J 5/00*   (2006.01)
(52) U.S. Cl. .................................. 250/338.4
(58) Field of Classification Search ............ 250/338.4
   See application file for complete search history.

(56) References Cited

U.S. PATENT DOCUMENTS

| | | | |
|---|---|---|---|
| 4,478,077 A | 10/1984 | Bohrer et al. | |
| 5,450,053 A | 9/1995 | Wood | |
| 6,605,806 B2* | 8/2003 | Walmsley et al. | 250/332 |
| 6,734,516 B2* | 5/2004 | Jacksen et al. | 257/431 |
| 6,777,681 B1* | 8/2004 | Schimert et al. | 250/338.4 |
| 2003/0168599 A1* | 9/2003 | Liddiard | 250/338.1 |

* cited by examiner

*Primary Examiner*—Constantine Hannaher
(74) *Attorney, Agent, or Firm*—Stetina Brunda Garred & Brucker

(57) ABSTRACT

A photoconductive bolometer infrared detector using a detector material that has a resistance changed due to photo-excitation and thermal-excitation from an incident radiation in the infrared range. The resistance changes caused by photo-excitation and the thermal excitation are additive for this detector material. The detector material is suspended over a substrate by a gap of one quarter wavelength of the incident radiation, such that the thermal absorption of the incident radiation can be enhanced. Preferably, the detector material is lead selenide that has a thermal coefficient of resistance as high as $3.45\%\ °C.^{-1}$, which is about 60% higher than that of vanadium oxide that has been widely used as the detector material in the conventional microbolometers. This detector structure allows dual band uncooled or moderately cooled operation. In the case of the use of PbSe as the detector material, largely enhanced MWIR operation is enabled over a standard uncooled microbolometer tuned to the LWIR, and high temperature dual band MWIR and LWIR operation is enabled as compared to quantum well or HgCdTe detectors that must be cooled to cryogenic temperatures.

31 Claims, 3 Drawing Sheets

PHOTOCONDUCTIVE BOLOMETER INFRARED DETECTOR

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates in general to an infrared light detector, and more particularly, to an infrared detector that is a photoconductive bolometer having good responsivity in the short or mid-wave infrared and also in the long-wave infrared.

When light strikes special types of materials, a voltage may be generated, a change in electrical resistance may occur, or electrons may be ejected from the material surface. As long as the light is present, the condition continues. These special types of materials are often used as optical detectors to detect the characteristics of an optical signal. Two broad classes of infrared optical detectors include photon detectors and thermal detectors. A photon detector generates free electrons when the incident radiation excites electrons from the valence band to the conduction band of the detector material. Therefore, the quantum of light must have sufficient energy to free an electron. The response of such type of detector is thus dependent on the wavelength or frequency of the incident radiation. In the thermal detector, the incident radiation is absorbed by the detector material and is manifested as an increase in vibration of atoms in the material, which is referred to as an increase in temperature.

One common type of photon detector is a photoconductive detector made of a semiconductor material. The change in resistance caused by excitation of electrons generated by the incident radiation is referred as $R_{pc}$. Heavily doped n-type or p-type semiconductor materials are frequently used for infrared photoconductive detectors. These photoconductive detectors are usually operated by applying a constant bias across them with a fixed voltage that induces an electric field in the material and then measuring the current flowing in the biasing circuit. Since the bandgaps of infrared photoconductive detectors are relatively small, a substantial number of electrons are thermally excited to the conduction band. A small increase in the detector temperature can in most cases excite an additional number of electrons that substantially exceeds those excited by the radiation. The detector temperature is often controlled within 0.01° C. of the nominal operating temperature or less to keep the thermally excited electrons, or thermal noise, from burying the optical signal.

One of the commonly used thermal detectors is a bolometer, which is also one of the first infrared detectors. The bolometer is a resistor that is thermally isolated and exposed to incident radiation, the bolometer temperature changes in proportion to the amount of incident radiation, and of course, the resistance of the device, $R_{TH}$, changes as well. The resistance change is measured in the same way as it is measured in a photoconductive detector element, by biasing the bolometer with a voltage and measuring the current through it. Bolometers are now found fairly wide use in thermal imaging. Thermally isolated resistor elements, called microbolometers because their small size, are formed in each cell of an integrated circuit called a focal plane array (FPA). The number of cells (or pixels) can be quite large in a typical imager, up to 100,000 elements or more. Megapixel resolution, available now in visible cameras, is certainly feasible for micro-bolometer FPAs as well. The circuitry in each cell senses the micro-bolometer resistance and outputs that information to the imaging electronics that generates the high resolution image.

A microbolometer device tends to have low signal voltage, and thus the most important figure of merit to consider during design and optimization is responsivity, which depends on bias current, thermal conductance, temperature coefficient of resistance (TCR), and coupling efficiency. The temperature coefficient of resistance (TCR) is critical in bolometer material selection. There has been a large amount of research to find a material with a large and stable temperature coefficient of resistance. Currently, vanadium oxide $VO_2$ and amorphous silicon are the most popular and promising materials for room temperature infrared bolometer applications. Semiconductor bolometers have been developed, but are typically used for sensing micro-wave radiation. The detector described herein is a semiconductor bolometer. The temperature coefficient of resistance (TCR) of vanadium oxide is between about 2.2 and 2.6% ° $C.^{-1}$. Ideal bolometer performance is limited by thermal noise and has a responsivity proportional to the bias current and the TCR.

The micro-bolometer is a power detector that works well in the low-wave infrared (LWIR) by using fast (that is, low f-stop number) optics viewing terrestrial scenes around 300 K. This is because infrared (IR) energy peaks in this LWIR waveband. For maximum quantum efficiency, the detector is designed with a cavity dimension set to one quarter of the desired peak wavelength. If the detector is designed for maximum efficiency in the LWIR, its out-of-band responsivity will be poor. For terrestrial scenes, infrared energy emitted in the mid-wave infrared (MWIR) is approximately $\frac{1}{10}$ of that emitted in the LWIR. For this reason, a micro-bolometer designed for peak response in the MWIR waveband will have a lower response than the LWIR micro-bolometer.

Therefore, the conventional photoconductive infrared detector, though having sufficient responsivity in the MWIR, often requires a cryogenic cooling system to prevent the optical signal from being buried by the thermally excited electrons or noise. The conventional bolometer designed for maximum efficiency in the LWIR normally has poor responsivity in the LWIR. There is thus a substantial need to develop a detector having numerous applications in infrared sensing systems with strict cost, size, weight, and power constraints that sense infrared radiation in both LWIR and either SWIR or MWIR without the requirement of using a cryogenic cooling system.

BRIEF SUMMARY OF THE INVENTION

A photoconductive bolometer infrared detector is provided. The photoconductive bolometer infrared detector uses a detector material that has a resistance changed due to photo-excitation and thermal-excitation from an incident radiation in the infrared range. The resistance changes caused by photo-excitation and the thermal excitation are additive for this detector material. The detector material is suspended over a substrate by a gap of one quarter wavelength of the incident radiation, such that the thermal absorption of the incident radiation can be enhanced. In one embodiment, the detector material includes lead selenide (PbSe) that has a thermal coefficient of resistance as high as 3.45%° $C.^{-1}$, which is about 60% higher than that of vanadium oxide that has been widely used as the detector material in the conventional microbolometers. This detector structure allows dual band uncooled or moderately cooled operation. By using PbSe as the detector material, largely enhanced mid-wave infrared (MWIR) operation is enabled over a standard uncooled micro-bolometer tuned to the LWIR, and high temperature dual band MWIR and long-wave infrared (LWIR) operation is enabled as compared to quantum well or HgCdTe detectors that must be cooled to cryogenic temperatures.

A photoconductive bolometer infrared detector device that includes a plurality of detector layers suspending over a substrate and a readout circuit formed in the substrate is also provided. When an incident radiation impinges on the detector layers, a resistance change caused by both photo-excitation and thermal excitation is measured by the readout circuit. These two resistance changes are additive. When the detector layers are fabricated from lead selenide, the detector is preferably sensitized to detect both long- and medium-wavelength infrared radiation. Using Lead Sulfide as the detector material, the detector is preferably sensitized to detect both long- and short-wavelength radiation.

In one embodiment, the PbSe detector layers are selectively sensitized, such that the medium-wavelength radiation can be detected by the sensitized detectors, while the long-wavelength radiation can be obtained by interpolation between outputs of the sensitized and unsensitized detector layers. Alternatively, high pass filters or medium-wavelength infrared absorbers may be applied to selective detector layers to achieve the same effect.

In contrast to a cooled long wavelength detector such as HgCdTe that is sensitive to medium wavelength radiation as well, this detector does not require cryogenic cooling in order to detect radiation in two wavelength bands.

BRIEF DESCRIPTION OF THE DRAWINGS

These as well as other features of the present invention will become more apparent upon reference to the drawings therein.

DETAILED DESCRIPTION OF THE INVENTION

Figure 1:
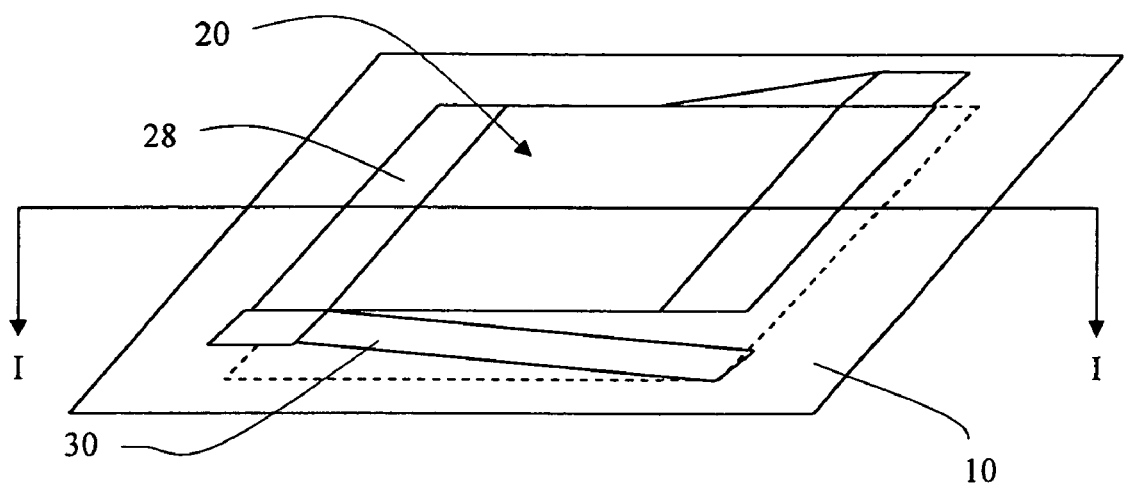
FIG. 1 shows a perspective view of a photoconductive microbolometer infrared detector.
Figure 2:
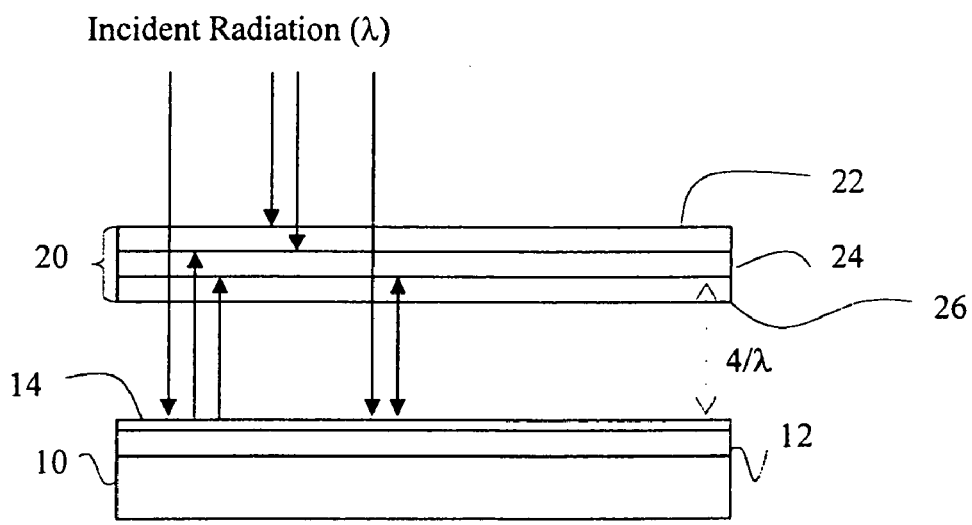
FIG. 2 is a cross sectional view of the photoconductive microbolometer infrared detector as shown in FIG. 1.

Referring now to the drawings wherein the showings are for the purpose of illustrating preferred embodiments of the present invention only, and not for the purposes of limiting the same, FIGS. 1 and 2 are the perspective and cross-sectional views, respectively, of an exemplary microbolometer infrared detector using lead selenide (PbSe) as the detector material. As shown, the microbolometer infrared detector 40 includes an active detector area 20 suspending over a substrate 10, a pair of conductive or metal contacts 28 at two opposing edges of the active detector area 20, and a pair of legs 30 extending from the substrate 10 to support the active detector area 20 over the substrate 10. The active detector area 20 includes a lead selenide layer 22 serving as a detector layer, a preferred but optional layer of absorber 24, and a protective layer 26. The protective layer 26 includes a silicon oxide layer, for example. The substrate 10 is preferably fabricated from materials such as silicon on which an integrated circuit and an array of the microbolometer infrared detectors 40 can be formed by semiconductor processes such as photolithography and etching. Preferably, the substrate 10 includes a readout circuit 14 formed underneath the active detector area 20 or in other areas of the substrate 10 and a thin film 14 of reflection layer coated aligned under the active detector area 20. In operation, the readout circuit 14 supplies a bias current to the active detector area 20 through the legs 30 and the conductive contacts 28 and reads the resistance change of the active detector area 20 when an incident radiation is applied thereto.

As shown in FIG. 2, when an infrared radiation is incident upon the microbolometer detector 40, a fraction of the infrared radiation absorbed by the lead selenide layer 22 excites electrons of the lead selenide layer 22 from the valence band to the conduction band, so as to cause resistance change $R_{PC}$ of the lead selenide layer 22. The remaining fraction of the radiation causes the lead selenide layer 22 to heat up. As the temperature of the lead selenide layer 22 increases, more thermal energy is applied to release free electrons that contribute further resistance change $R_{TH}$. The total resistance changes $P_{total}$ caused by the incident radiation can then be obtained by adding both the photoconductive resistance change $R_{PC}$ with the thermal resistance change $P_{TH}$. Therefore, the lead selenide layer 22 provides a greater response than the traditional temperature controlled detector.

As discussed above, heat conductance affects the responsivity of the microbolometer detector 40. To maximize the responsivity, the thermal conductance of the bolometer has to be minimized, that is, the thermal impedance has to be maximized. In this embodiment, the microbolometer thin film, that is, the active detector layer 20, is supported by the legs 30 to suspend over the substrate 10 to prevent a direct contact which ultimately increases the thermal conductance. In addition to heat conductance, the coupling efficiency, that is, the ratio of the absorbed power to the incident power of the active detector layer 20 is also considered in this embodiment. As shown in FIG. 2, the incident radiation that is propagating through the active detector area 20 is reflected by the surface of the substrate 10 to impinge upon the active detector area 20 again. It is known that when the gap between active detector layer 20 and the substrate 10 is filled with a vacuum cavity, the first resonance is generated at a wavelength 4 times the actual thickness of the cavity spacing, or gap. Therefore, in this embodiment, the gap between the active detector layer 20 and the substrate 10 is one quarter wavelength $\frac{1}{4} \lambda$ of the incident radiation.

Figure 3:
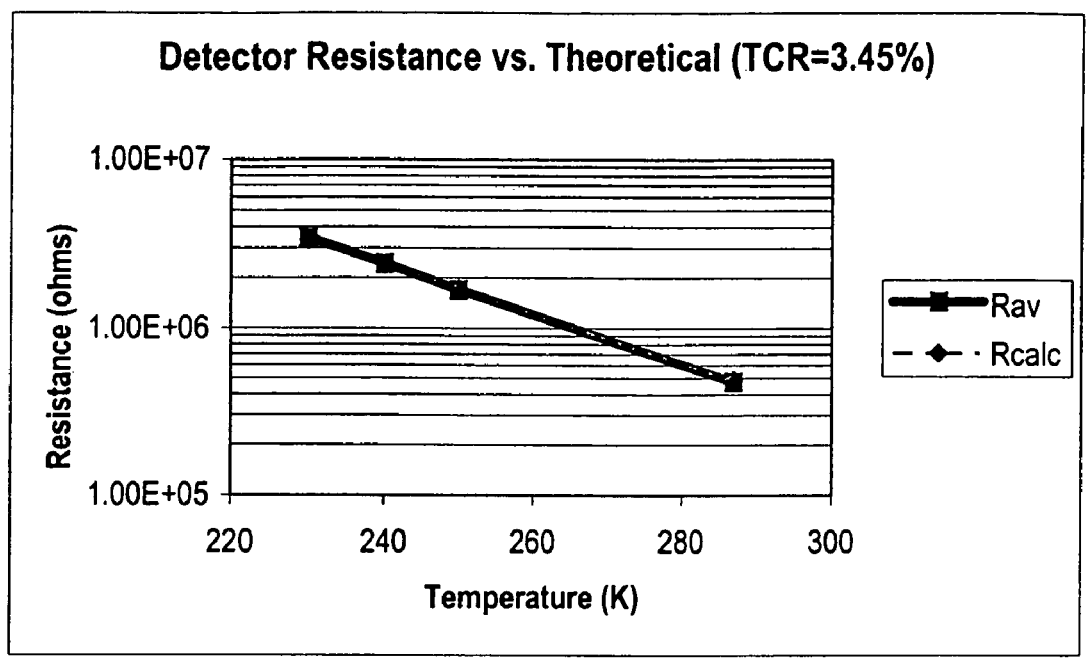
FIG. 3 shows the calculated and empirical resistance of the photoconductive microbolometer infrared detector as a function of temperature.
Figure 4:
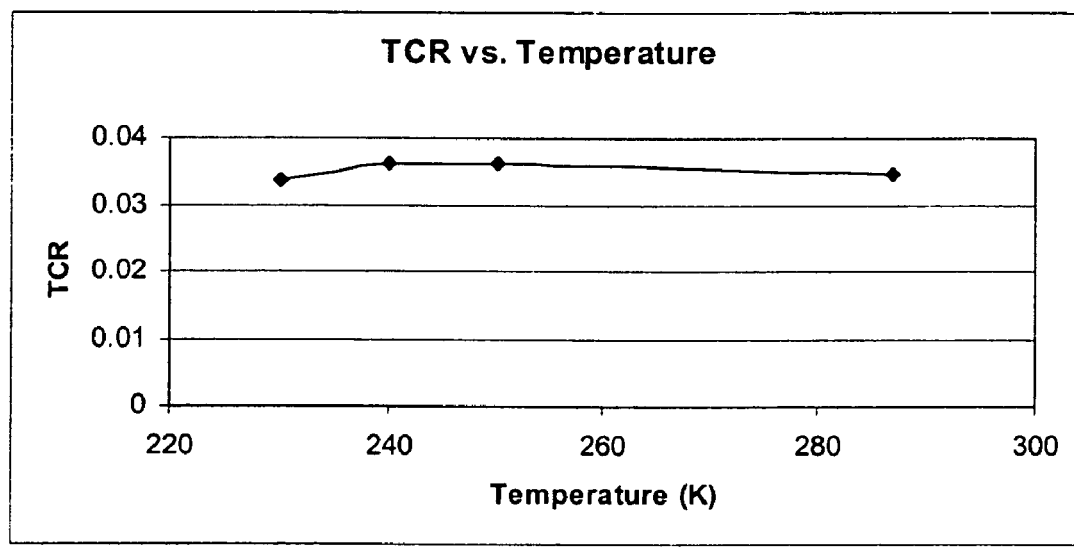
FIG. 4 shows the temperature coefficient of resistance of the photoconductive microbolometer infrared detector as a function of temperature.

FIG. 3 shows the calculated lead selenide microbolometer detector resistance over operating temperatures and empirical lead selenide microbolometer detector resistance averaged from six detector samples over the operating temperature range between about 230° K and about 290° K. FIG. 3 shows the thermal coefficient of resistance for the lead selenide microbolometer detector. As shown, the thermal coefficient of the resistance for the lead selenide microbolometer detector ranging between 3.35%° C.$^{-1}$ and 3.65%° C.$^{-1}$ matches the theoretical data of 3.45%° C.$^{-1}$. Therefore, the microbolometer detector using lead selenide as the detector material has a thermal coefficient of resistance approximately 60% higher than that of the microbolometer detector using vanadium oxide as the detector material. It will be appreciated that in addition to lead selenide, any material that has additive resistance changes caused by photo-excitation and thermal excitation can be used to form the microbolometer detector. For example, amorphous silicon has a thermal coefficient of resistance tunable as high as about 4.5% C.$^{-1}$ and may be another candidate for forming the microbolometer detector.

As the total resistance change of the photoconductive microbolometer infrared detector as shown in FIGS. 1 and 2 is the sum of the resistance change $R_{PC}$ caused by photo-excitation and the resistance $R_{TH}$ caused by thermal excitation, the response of the photoconductive microbolometer infrared detector does not only have a response greater than that of the conventional temperature controlled photoconductive detectors but it also provides a much greater response compared to the conventional microbolometer detectors. Further, as the detector material used in the photoconductive microbolometer infrared detector has a much higher thermal coefficient of resistance, the performance is further enhanced.

Figure 5:
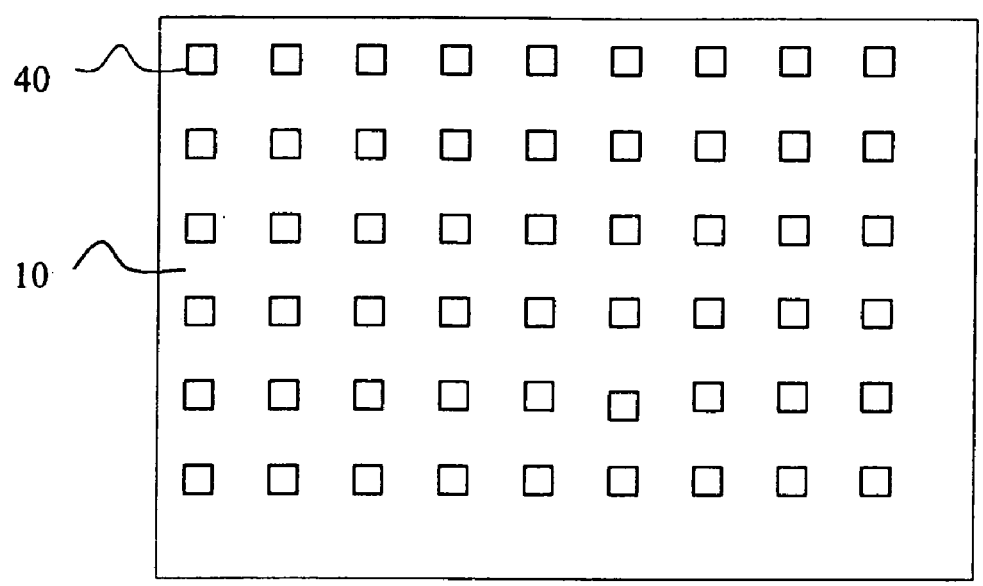
FIG. 5 is a top view showing an array of photoconductive microbolometer infrared detectors formed on a substrate.
Figure 6:
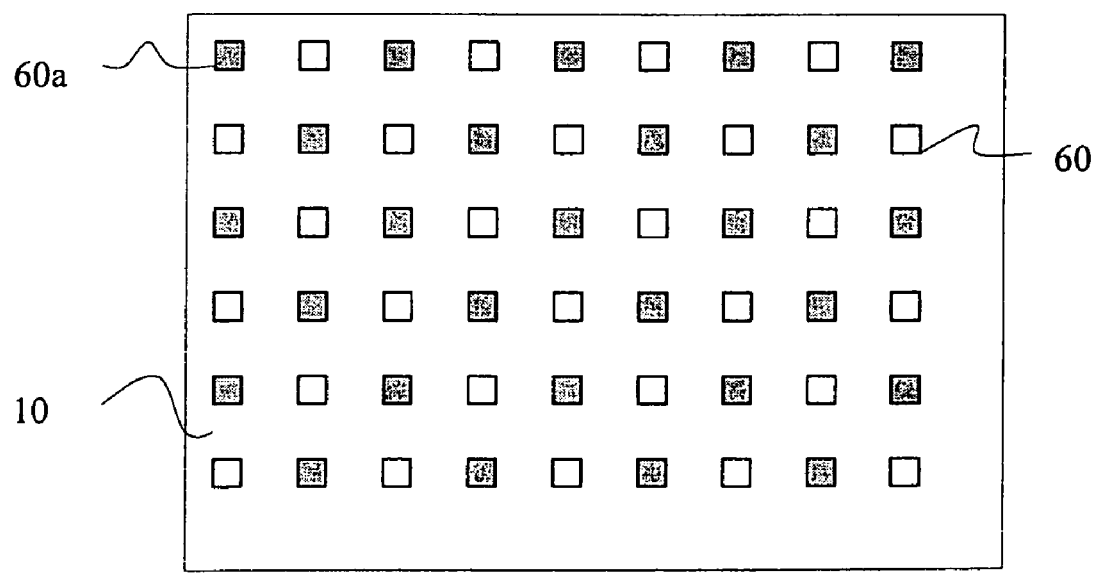
FIG. 6 is a top view showing a dual-band photoconductive microbolometer infrared device.

As mentioned above, a great number of the photoconductive microbolometer infrared detectors 40 as shown in FIGS. 1 and 2 can be arranged as an array on the substrate for application such as high-resolution optical detection or thermal imaging. As the number of the photoconductive microbolometer infrared detectors 40 increases, the resolution is enhanced. FIG. 5 shows a top view of a device including an array of photoconductive microbolometer infrared detectors 40 suspended over the substrate 10 that has similar structures as shown in FIGS. 1 and 2. It is known that lead selenide is a IV-VI metal compound that needs to be sensitized (doped) with n-type dopant to become photoconductive in the medium-wavelength infrared (MWIR) range. Therefore, depending on the incident infrared radiation to be detected, the detector layers of the photoconductive microbolometer infrared detectors 40 can be sensitized (doped), preferably with n-type dopants. FIG. 6 shows a dual-band MWIR/LWIR detector that includes an array of photoconductive microbolometer infrared detectors 60 and 60a suspending over the substrate 10. The detectors 60a have been sensitized, such that both MWIR and LWIR radiations can be detected thereby, while the detectors 60 that are not sensitized can only detect LWIR radiation. By interpolating the outputs of the detectors 60 and 60a, the LWIR radiation can be detected. In this embodiment, the sensitized and unsensitized detectors 60 and 60a are arranged in a checkerboard pattern.

Alternatively, a MWIR absorber 26 may be attached to the detectors 60a to selectively enhance the absorption of MWIR radiation. In another approach, both the detectors 60 and 60a can be sensitized, while a high pass filter that filters the MWIR radiation can be applied to the detectors 60. The high pass filter may be applied for filtering outputs of a selective portion of the photoconductive microbolometer detector units. Or alternatively, a low pass filter that filters the LWIR radiation can be applied to the detectors 60a. The MWIR radiation and the LWIR radiation can thus be detected by device as shown in FIG. 6. It will be appreciated that the detectors 60 and 60a can be arranged in any patterns other than the checkerboard as shown in FIG. 6 without exceeding the scope of the present invention.

This disclosure provides exemplary embodiments of a photoconductive microbolometer infrared detector device. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A photoconductive microbolometer detector, comprising:
   a detector layer suspended over a substrate, wherein the detector layer has a resistance variable by photo excitation and thermal excitation caused by an incident long-, medium-or short-wavelength infrared radiation; and
   a readout circuit formed in the substrate supplying a bias current to the detector layer, the readout circuit being operative to read resistance change of the detector layer caused by the incident infrared radiation impinging on the detector layer.

2. The detector of claim 1, wherein the detector layer is fabricated from a photoconductive semiconductor.

3. The detector of claim 2, wherein the detector layer is fabricated from lead selenide (PbSe).

4. The detector of claim 2, wherein the detector layer is fabricated from amorphous silicon.

5. The detector of claim 2, wherein the detector layer is sensitized.

6. The detector of claim 1, wherein the detector layer suspends over the substrate by an air cavity of one quarter wavelength of the incident radiation.

7. The detector of claim 1, further comprising an absorber or structural support layer attached to the detector layer.

8. The detector of claim 1, wherein the substrate further comprising a reflective layer aligned under the detector layer.

9. The detector of claim 1, further comprising at least one leg extending from the substrate to support the detector layer suspended over the substrate.

10. The detector of claim 9, further comprising a pair of conductive contacts extending from two opposite edges of the detector layer for connecting the leg.

11. A photoconductive microbolometer detector, comprising:
    a lead selenide detector layer suspended over a substrate;
    at least two legs supporting the detector layer to suspend over the substrate; and
    a readout circuit in the substrate for supplying a bias current to the detector layer and to read resistance change of the detector layer when incident radiation impinges thereon.

12. The detector of claim 11, wherein the detector is suspending over the substrate by a vacuum or air gap of one quarter wavelength of the incident radiation.

13. The detector of claim 11, further comprising an absorber or structure support layer attached to a bottom surface of the detector layer.

14. The detector of claim 11, wherein the lead selenide detector layer is sensitized.

15. A photoconductive microbolometer detection device, comprising:
    a substrate;

a plurality of photoconductive microbolometer detector units suspended over the substrate, each of the detector units includes a detector layer; and a readout circuit formed in the substrate for supplying a bias current to and to detect an electrical resistance change of each photoconductive microbolometer detector units is caused by both photo-excitation and thermal-excitation of each detector layer by an incident long-, medium-, or short-wavelength infrared radiation.

16. The device of claim 15, wherein the detector layer is fabricated from lead selenide.

17. The device of claim 15, wherein each of the photoconductive microbolometer detector units comprises at least two legs extending from the substrate for supporting the detector unit to suspend over the substrate.

18. The device of claim 15, wherein each of the photoconductive microbolometer detector units comprises an absorber attached to the detector layer.

19. The device of claim 15, wherein the substrate includes a silicon substrate.

20. The device of claim 15, wherein the incident radiation includes infrared radiation.

21. The device of claim 15, wherein the detector layers of the photoconductive microbolometer detector units are selectively sensitized.

22. The device of claim 21, wherein the sensitized photoconductive microbolometer detector units and the non-sensitized photoconductive microbolometer detector units are arranged in a checkerboard pattern over the substrate.

23. The device of claim 15, wherein a plurality of medium-wavelength infrared absorbers is attached to the detector layers of a portion of the photoconductive microbolometer detector units.

24. The device of claim 15, wherein the detector layers of the photoconductive microbolometer detector units are sensitized.

25. The device of claim 24, further comprising a plurality of low pass filters applied to a selective portion of the photoconductive microbolometer detector units.

26. A photoconductive microbolometer infrared detector, comprising a detector layer made of selenide, wherein the detector is operative to detect a long, medium-, or short wavelength infrared signal incident thereon by measuring an electric resistance change thereof.

27. The device of claim 26, wherein the lead selenide layers are selectively sensitized to detect both long-wavelength infrared radiation and medium-wavelength infrared radiation.

28. The device of claim 27, wherein the unsensitized lead selenide layers are operative to detect long-wavelength infrared radiation only.

29. The device of claim 26, further comprising a plurality of medium-wavelength infrared absorbers attached to a selective portion of the lead selenide layers.

30. The device of claim 26, wherein the lead selenide layers are sensitized to detect medium- and long-wavelength infrared radiations.

31. A photoconductive microbolometer infrared detector, comprising:

a substrate; and a plurality of lead selenide layers suspended over the substrate.

* * * * *